United States Patent
Shimizu

(10) Patent No.: US 10,632,910 B2
(45) Date of Patent: Apr. 28, 2020

(54) DRIVING SUPPORT DEVICE, DRIVING SITUATION INFORMATION ACQUIRING SYSTEM, DRIVING SUPPORT METHOD, AND PROGRAM

(71) Applicant: NEC Corporation, Minato-ku, Tokyo (JP)

(72) Inventor: Yuta Shimizu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/170,213

(22) Filed: Oct. 25, 2018

(65) Prior Publication Data

US 2019/0135178 A1    May 9, 2019

(30) Foreign Application Priority Data

Nov. 6, 2017   (JP) ................. 2017-214172

(51) Int. Cl.
   *B60Q 9/00*     (2006.01)
   *G06K 9/00*     (2006.01)
   *B60Q 5/00*     (2006.01)

(52) U.S. Cl.
   CPC ......... *B60Q 9/00* (2013.01); *G06K 9/00845* (2013.01); *B60Q 5/005* (2013.01); *G06K 9/0061* (2013.01); *G06K 9/00228* (2013.01)

(58) Field of Classification Search
   CPC ............................. G06K 9/00845; B60Q 9/00
   See application file for complete search history.

(56) References Cited

U.S. PATENT DOCUMENTS

| | | | |
|---|---|---|---|
| 2007/0159309 A1* | 7/2007 | Ito | G16H 10/20 340/425.5 |
| 2009/0009309 A1 | 1/2009 | Matsuoka et al. | |
| 2012/0057749 A1* | 3/2012 | Takahashi | G08G 1/167 382/103 |
| 2014/0043459 A1* | 2/2014 | Tsukizawa | G06K 9/00604 348/78 |
| 2015/0010207 A1* | 1/2015 | Inada | B60K 35/00 382/103 |
| 2016/0110618 A1* | 4/2016 | Oba | G06K 9/00805 348/148 |
| 2017/0305440 A1* | 10/2017 | Oba | B60W 50/082 |
| 2018/0111551 A1* | 4/2018 | Suzuki | G06K 9/00798 |

FOREIGN PATENT DOCUMENTS

| | | |
|---|---|---|
| JP | 2009-015550 A | 1/2009 |
| WO | 2016/166791 A1 | 10/2016 |

* cited by examiner

*Primary Examiner* — Fabricio R Murillo Garcia

(57) ABSTRACT

A direction in which a driver is looking can be evaluated even when the direction in which the driver should look has changed depending on the driving situation. A driving support device includes a face direction determinator that determines the direction of the face of a driver of a movable body, a line-of-sight direction determinator that determines the direction of the line of sight of the driver, and an alert processing unit that determines at least one of the necessity and an extent of alerting the driver on the basis of an extent of the difference between the direction of the face and the direction of the line of sight.

10 Claims, 7 Drawing Sheets

DRIVING SUPPORT DEVICE, DRIVING SITUATION INFORMATION ACQUIRING SYSTEM, DRIVING SUPPORT METHOD, AND PROGRAM

INCORPORATION BY REFERENCE

This application is based upon and claims the benefit of priority from Japanese patent application No. 2017-214172, filed Nov. 6, 2017, the disclosure of which is incorporated herein in its entirety by reference.

TECHNICAL FIELD

The present invention relates to a driving support device, a driving situation information acquiring system, a driving support method, and a program.

BACKGROUND ART

A driving support technique for determining whether or not the direction of the line of sight of a driver is appropriate has been proposed.

For example, an inattention determining device described in Japanese Unexamined Patent Application, First Publication No. 2009-15550 determines whether or not the direction of the face of a driver is within a predetermined range from the front of a vehicle and whether or not a field of view calculated on the basis of the line of sight of the driver includes a predetermined range from the front of the vehicle. When any of such conditions is not satisfied, the inattention determining device determines that the driver is inattentive.

A driving support device described in Republished Japanese Translation No. WO2016/166791 of the PCT International Publication determines whether or not to generate safe driving support information on the basis of the degree of coincidence between an actual distribution of the line of sight of a driver and an ideal distribution of the line of sight. The driving support device generates information in which the actual distribution of the line of sight is superimposed on an image including scenery in front of the vehicle as the safe driving support information and displays the generated information on a display.

SUMMARY

The direction in which a driver should look is considered to change depending on a driving situation. For example, when a vehicle travels on a long curve, the direction in which the driver should look is considered to shift from the front of the vehicle to the direction of the curve.

Thus, it is preferable to be able to evaluate the direction in which the driver is looking even when the direction in which the driver should look has changed depending on the driving situation.

It is an object of the present invention to provide a driving support device, a driving situation information acquiring system, a driving support method, and a program which can solve the above problems.

According to a first aspect of the present invention, a driving support device includes a face direction determinator configured to determine a direction of a face of a driver of a movable body, a line-of-sight direction determinator configured to determine a direction of a line of sight of the driver, and an alert processing unit configured to determine at least one of the necessity and the extent of alerting the driver on the basis of the extent of a difference between the direction of the face and the direction of the line of sight.

According to a second aspect of the present invention, a driving situation information acquiring system includes an in-vehicle system mounted in a movable body, and a driving situation information acquiring device configured to perform communication with the in-vehicle system, wherein the in-vehicle system includes an imaging device configured to capture an image of a face of a driver of the movable body, and the driving situation information acquiring device includes a face direction determinator configured to determine a direction of the face of the driver on the basis of the image of the face of the driver, a line-of-sight direction determinator configured to determine a direction of a line of sight of the driver on the basis of the image of the face of the driver, and a driving situation information acquirer configured to calculate the extent of a difference between the direction of the face and the direction of the line of sight.

According to a third aspect of the present invention, a driving support method comprises determining a direction of a face of a driver of a movable body, determining a direction of a line of sight of the driver, and determining at least one of the necessity and the extent of alerting the driver on the basis of the extent of a difference between the direction of the face and the direction of the line of sight.

According to a fourth aspect of the present invention, a non-transitory computer-readable recording medium storing a program that causes a computer to execute processing including determining a direction of a face of a driver of a movable body, determining a direction of a line of sight of the driver, and determining at least one of the necessity and the extent of alerting the driver on the basis of the extent of a difference between the direction of the face and the direction of the line of sight.

EXAMPLE EMBODIMENT

Hereinafter, embodiments of the present invention will be described. However, the following embodiments do not limit the invention according to the claims. In addition, not all combinations of the features described in the embodiments are necessarily essential to the solution of the invention.

<First Embodiment>

Figure 1:
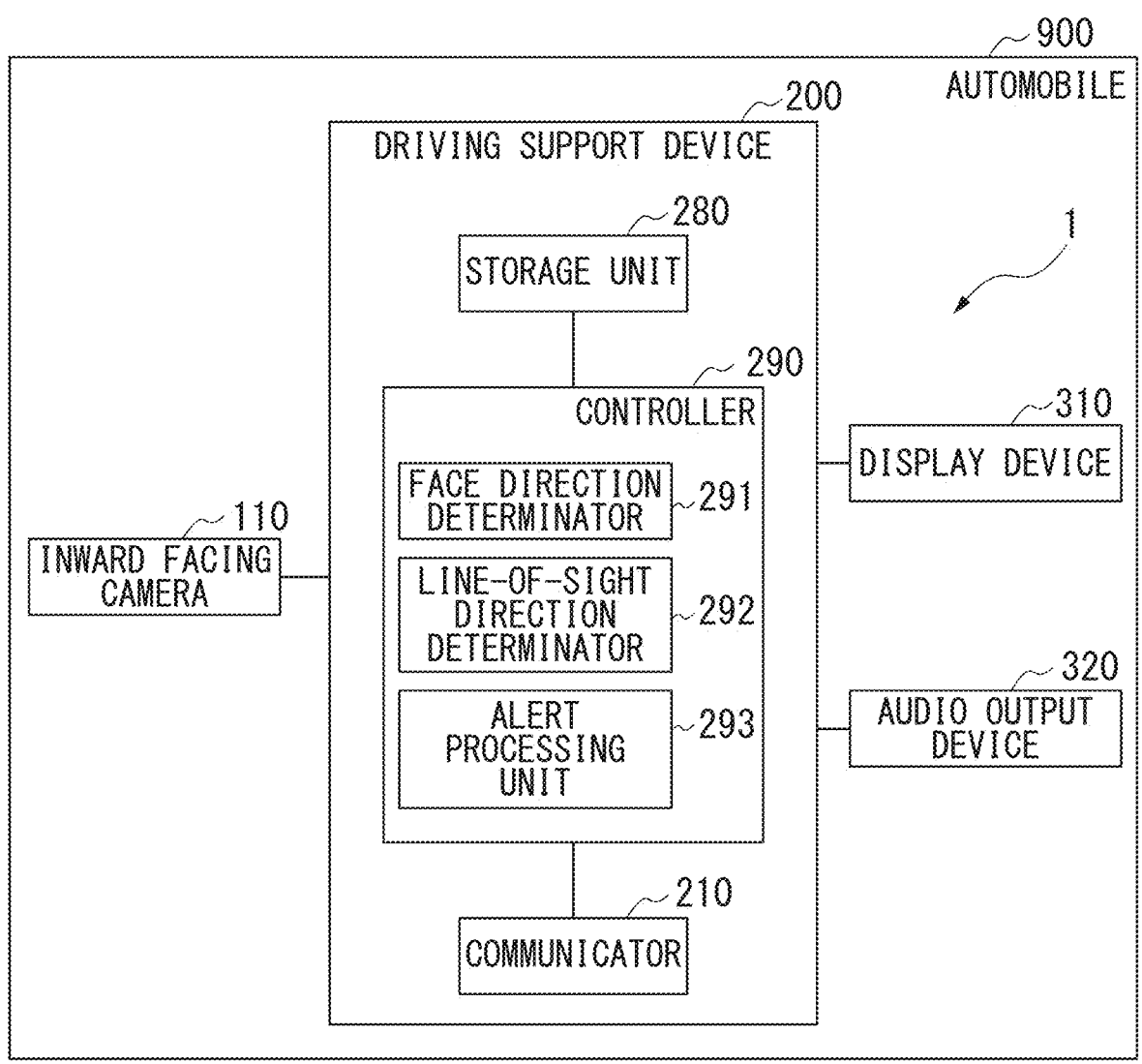
FIG. 1 is a schematic block diagram showing a functional configuration of a driving support system according to a first embodiment of the present invention.

FIG. 1 is a schematic block diagram showing a functional configuration of a driving support system according to a first embodiment of the present invention. As shown in FIG. 1, the driving support system 1 includes an inward facing camera 110, a driving support device 200, a display device 310, and an audio output device 320. The driving support device 200 includes a communicator 210, a storage unit 280, and a controller 290. The controller 290 includes a face direction determinator 291, a line-of-sight direction determinator 292, and an alert processing unit 293.

The case in which the driving support system 1 is mounted in an automobile 900 will be described below as an example.

However, a movable body to which the driving support system 1 is applied is not limited to the automobile and may be any of various types of vehicles in which a driver needs to look in a proper direction while driving.

The driving support system 1 is a system for evaluating the direction in which the driver is looking. In particular, the driving support system 1 alerts the driver when, on the bases of a difference between the direction of the face of the driver and the direction of the line of sight, the difference remains equal to or greater than a predetermined threshold value for a predetermined time or longer. The driving support system 1 uses the front direction of the face as the direction of the face. The direction of the face can be determined on the basis of the direction or arrangement of one or more parts of the face. For example, the driving support system 1 may determine the direction of the face on the basis of the direction of the nose or may determine the direction of the face on the basis of the positional relationship between the eyes and ears.

The inward facing camera 110 images the face of the driver from the front side. An image captured by the inward facing camera 110 is used to determine the direction of the face of the driver and the direction of the line of sight of the driver.

The driving support device 200 evaluates the direction in which the driver is looking on the basis of the image captured by the inward facing camera 110 and determines whether or not to alert the driver or the extent or mode of alerting the driver.

The driving support device 200 is configured, for example, using a computer such as an in-vehicle computer. Alternatively, the driving support device 200 may be provided outside the vehicle such as in the cloud. In this case, the driving support device 200 may receive the image of the inward facing camera 110 from the automobile 900, evaluate the direction in which the driver is looking, and transmit the evaluation result to the automobile 900.

The communicator 210 performs communication with other devices. In particular, the communicator 210 receives the image captured by the inward facing camera 110 as image data.

The storage unit 280 stores various types of data. The storage unit 280 is configured using a storage device included in the driving support device 200.

The controller 290 controls each part of the driving support device 200 and performs various types of processing. The controller 290 is configured, for example, by a central processing unit (CPU) included in the driving support device 200 reading a program from the storage unit 280 and executing the program.

In addition, the controller 290 determines whether or not the driving scene of the automobile 900 corresponds to a predetermined scene on the basis of at least one of the moving speed and the moving direction of the automobile 900. Upon determining that the driving scene corresponds to the predetermined scene, the controller 290 suppresses the alerting of the driver.

For example, even when the driver is looking in the proper direction, the direction of the face and the direction of the line of sight may be considered to deviate from each other if the driver is backing the automobile 900 up or if the driver is parking the automobile 900. Therefore, the controller 290 suppresses the alerting of the driver upon determining that the driver is backing the automobile 900 up. Further, when the automobile 900 is at a low speed and switches between forward and reverse traveling in a short time, the controller 290 determines that the driver is parking the automobile 900 and suppresses the alerting of the driver.

The face direction determinator 291 determines the direction of the face of the driver on the basis of the image of the face of the driver captured by the inward facing camera 110. The direction of the face can be determined on the basis of the direction or arrangement of one or more parts of the face as described above. For example, the face direction determinator 291 may determine the direction of the face on the basis of the direction of the nose or may determine the direction of the face on the basis of the positional relationship between the eyes and ears. A known algorithm can be used as an algorithm that the face direction determinator 291 uses to determine the direction of the face.

The line-of-sight direction determinator 292 determines the direction of the line of sight of the driver on the basis of the image of the face of the driver captured by the inward facing camera 110. For example, the line-of-sight direction determinator 292 may determine the position of an iris in the image of the face of the driver captured by the inward facing camera 110 and determine the direction of the line of sight on the basis of both the direction of the face determined by the face direction determinator 291 and the position of the iris in the face. A known algorithm can be used as an algorithm that the line-of-sight direction determinator 292 uses to determine the direction of the line of sight.

The alert processing unit 293 determines at least one of the necessity and the extent of alerting the driver on the basis of the extent of the difference between the direction of the face determined by the face direction determinator 291 and the direction of the line of sight determined by the line-of-sight direction determinator 292. Specifically, when the extent of the difference between the direction of the face of the driver and the direction of the line of sight remains equal to or greater than a predetermined threshold value for a predetermined time or longer, the alert processing unit 293 determines to perform stronger alerting of the driver than at normal times.

Here, the face direction determinator 291 sometimes cannot determine the direction of the face and the line-of-sight direction determinator 292 sometimes cannot determine the direction of the line of sight depending on the direction of the face of the driver with respect to the imaging direction (the direction of the optical axis) of the inward facing camera 110. The case in which the face direction determinator 291 cannot determine the direction of the face and the case in which the line-of-sight direction determinator 292 cannot determine the direction of the line of sight may be assumed to be the same case in which the extent of the difference between the direction of the face and the direction of the line of sight is equal to or greater than the threshold value. Specifically, the alert processing unit 293 may determine at least one of the necessity and the extent of alerting the driver, assuming that such a case is the same as when the extent of the difference between the direction of the face and the direction of the line of sight is equal to or greater than the threshold value.

The display device 310 and the audio output device 320 are used to alert the driver.

For example, the display device 310 has a display screen such as a liquid crystal panel or a light emitting diode (LED) panel and displays various images. In particular, the display device 310 displays a message alerting the driver under the control of the driving support device 200.

The audio output device 320 includes a speaker and outputs sound. In particular, the audio output device 320 outputs a voice message or a notification sound that alerts the driver under the control of the driving support device 200.

The display device 310 and the audio output device 320 may be provided exclusively for the driving support system 1. Alternatively, the display device 310 and the audio output device 320 may be shared with other systems or devices such as a car navigation system.

Next, the operation of the driving support device 200 will be described with reference to FIG. 2.

Figure 2:
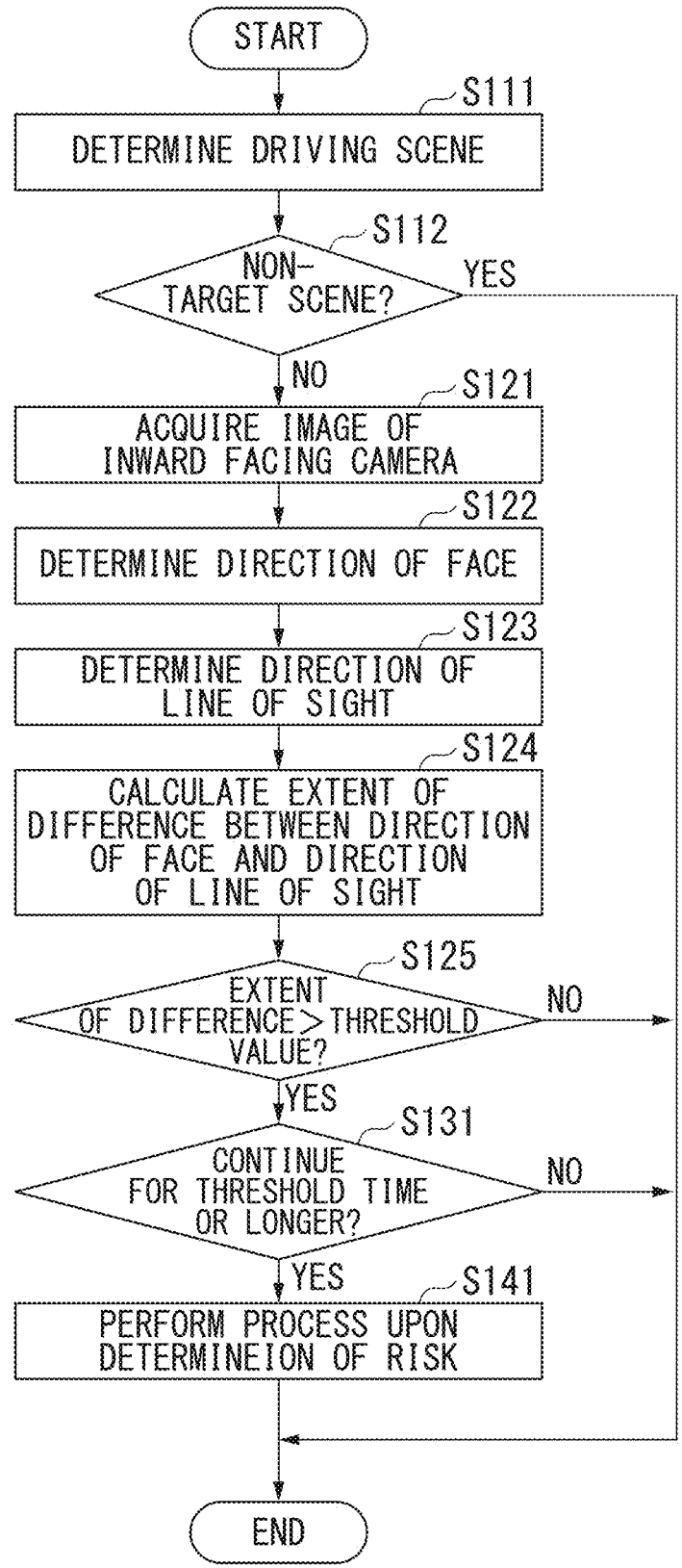
FIG. 2 is a flowchart showing an exemplary procedure in which a driving support device according to the first embodiment determines the direction of the face and the direction of the line of sight of a driver and performs alert processing.

FIG. 2 is a flowchart showing an exemplary procedure in which the driving support device 200 determines the direction of the face and the direction of the line of sight of the driver and performs alert processing. The alert processing here may include determination as to whether or not to alert the driver.

For example, the driving support device 200 repeatedly performs the processing of FIG. 2.

In the processing of FIG. 2, the controller 290 determines a driving scene of the automobile 900 (step S111) and determines whether or not the driving scene corresponds to a non-target scene for alerting of the driver (step S112). For example, the controller 290 determines whether or not the driver is backing the automobile 900 up and whether or not the driver is parking the automobile 900 as described above.

Upon determining that the driving scene corresponds to a non-target scene (step S112: YES), the controller 290 terminates the processing of FIG. 2.

On the other hand, upon determining that the driving scene does not correspond to a non-target scene (step S112: NO), the communicator 210 acquires (receives) an image of the face of the driver from the inward facing camera 110 (step S121).

Then, the face direction determinator 291 determines the direction of the face of the driver on the basis of the image of the face of the driver captured by the inward facing camera 110 (step S122). In addition, the line-of-sight direction determinator 292 determines the direction of the line of sight of the driver on the basis of the image of the face of the driver captured by the inward facing camera 110 (step S123).

Then, the alert processing unit 293 calculates the extent of the difference between the direction of the face determined by the face direction determinator 291 and the direction of the line of sight determined by the line-of-sight direction determinator 292 (step S124).

The alert processing unit 293 may also calculate the magnitude of the angle between the direction of the face and the direction of the line of sight. Alternatively, the alert processing unit 293 may calculate the distance between gaze regions in a certain plane corresponding to each of the direction of the face and the direction of the line of sight as will be described later with reference to FIG. 4.

Next, the alert processing unit 293 determines whether or not the extent of the difference calculated in step S124 is greater than a predetermined threshold value (step S125).

Upon determining that the extent of the difference is equal to or less than the threshold value (step S125: NO), the controller 290 terminates the processing of FIG. 2.

On the other hand, upon determining that the extent of the difference is greater than the threshold value (step S125: YES), the alert processing unit 293 determines whether or not the extent of the difference remains greater than the threshold value for a predetermined threshold (threshold time) or longer (step S131).

Upon determining that the duration during which the extent of the difference remains greater than the threshold value is less than the threshold time (step S131: NO), the controller 290 terminates the processing of FIG. 2.

On the other hand, upon determining that the extent of the difference remains greater than the threshold value for the threshold time or longer (step S131: YES), the alert processing unit 293 performs processing which is defined as a process performed when a risk is determined (step S141).

For example, the alert processing unit 293 controls the display device 310 such that it displays a message prompting visual checking of the surroundings and controls the audio output device 320 such that it outputs a notification sound.

After step S141, the controller 290 terminates the processing of FIG. 2.

FIG. 2 shows an exemplary case in which the alert processing unit 293 determines whether or not to alert the driver. The present invention is not limited to this and the alert processing unit 293 may determine a mode of the alert such as the strength with which the driver is alerted. For example, the alert processing unit 293 may control the display device 310 such that it always displays a message. In this case, in step S141, the alert processing unit 293 may cause the display device 310 to change the message to be displayed and cause the audio output device 320 to output a notification sound.

As described above, the face direction determinator 291 determines the direction of the face of the driver. The line-of-sight direction determinator 292 determines the direction of the line of sight of the driver. The alert processing unit 293 determines at least one of the necessity and the extent of alerting the driver on the basis of the extent of the difference between the direction of the face determined by the face direction determinator 291 and the direction of the line of sight determined by the line-of-sight direction determinator 292.

The direction of the face of the driver and the direction of the line of sight are generally considered to coincide roughly regardless of the direction in which the driver should look except in specific driving scenes such as when the driver faces back to back the automobile 900 up. When the direction of the face of the driver and the direction of the line of sight do not coincide roughly, the driver is considered to be, for example, looking away such as, for example, when the driver is distracted by the scenery of the roadside.

Therefore, the alert processing unit 293 alerts the driver when the direction of the face of the driver and the direction of the line of sight differ by a predetermined condition or more. Thus, according to the driving support device 200, it is possible to evaluate the direction in which the driver is looking even when the direction in which the driver should look has changed depending on the driving situation.

In addition, the alert processing unit 293 alerts the driver when the extent of the difference between the direction of the face and the direction of the line of sight remains equal to or greater than a predetermined threshold value for a predetermined time or longer.

Here, when the driver changes a direction in which the driver gazes, the direction of the face and the direction of the line of sight can be considered to deviate once and then be made to coincide roughly such as when the driver first moves his or her line of sight and then moves his or her face.

The alert processing unit 293 can prevent the driver from being alerted when the direction of the face and the direction of the line of sight deviate from each other for a short time by determining the duration during which the direction of the face and the direction of the line of sight remains different. Thus, it is possible to avoid annoying the driver with frequent alerting.

In addition, the alert processing unit 293 alerts the driver, assuming that the case in which at least one of the face direction and the line of sight cannot be determined is the same as when the extent of the difference between the direction of the face and the direction of the line of sight is equal to or greater than a threshold value.

When the face direction determinator 291 cannot determine the direction of the face and when the line-of-sight direction determinator 292 cannot determine the direction of the line of sight, the position and direction of the face of the driver are considered to have significantly deviated from ordinary. In this case, the driver is considered that gaze is different from ordinary gaze (for example, looking at the front of the automobile 900 and the surroundings thereof at the same time), and there is a possibility that danger will increase.

Therefore, the alert processing unit 293 assumes that the case in which it is not possible to determine at least one of the direction of the face and the direction of the line of sight is the same as when the extent of the difference between the direction of the face and the direction of the line of sight is equal to or greater than a threshold value. Thus, for example, the alert processing unit 293 can alert the driver when the inability of the face direction determinator 291 to determine the direction of the face or the inability of the line-of-sight direction determinator 292 to determine the direction of the line of sight continues for a predetermined time or longer.

In addition, the controller 290 suppresses the alerting of the driver upon determining that the driving scene of the automobile 900 corresponds to a predetermined scene on the basis of at least one of the moving speed and the moving direction of the automobile 900.

By doing this, it is possible to suppress the alerting in a scene in which alerting is not appropriate and to prevent the driver from feeling annoyed.

<Second Embodiment>

Displaying the deviation between the direction of the face and the direction of the line of sight by the driving support system 1 is a reference for the driver to understand the content of the alerting. The second embodiment will be described with regard to the case in which the driving support system 1 displays the deviation between the direction of the face and the direction of the line of sight. Otherwise, the second embodiment is similar to the first embodiment.

Figure 3:
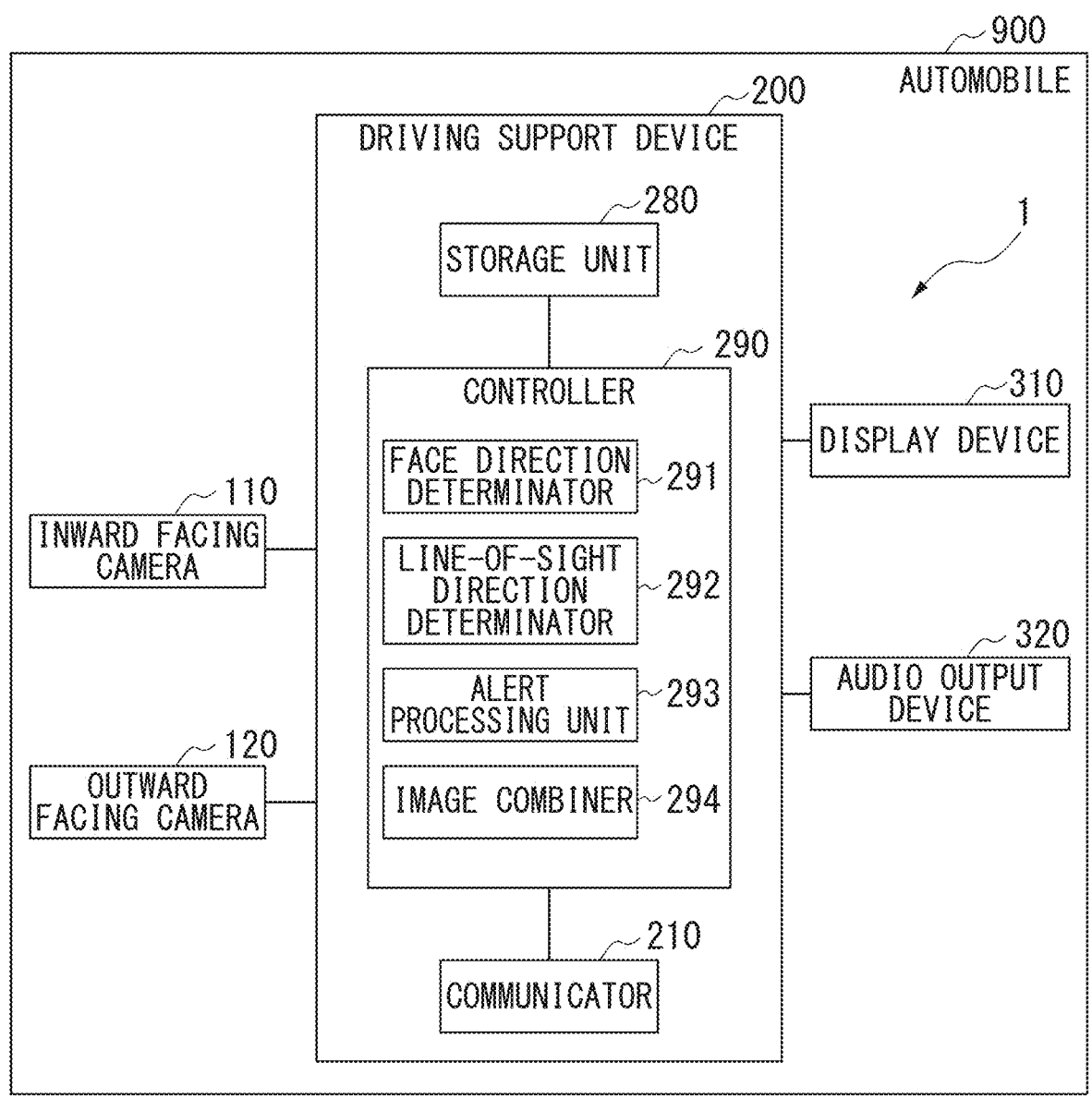
FIG. 3 is a schematic block diagram showing a functional configuration of a driving support system according to a second embodiment of the present invention.

FIG. 3 is a schematic block diagram showing a functional configuration of the driving support system according to the second embodiment of the present invention. As shown in FIG. 3, the driving support system 1 includes an inward facing camera 110, an outward facing camera 120, a driving support device 200, a display device 310, and an audio output device 320. The driving support device 200 includes a communicator 210, a storage unit 280, and a controller 290. The controller 290 includes a face direction determinator 291, a line-of-sight direction determinator 292, an alert processing unit 293, and an image combiner 294.

Of the parts shown in FIG. 3, those corresponding to and having the same functions as those shown in FIG. 1 are denoted by the same reference signs (1, 110, 200, 210, 280, 290, 291, 292, 293, 310, 320, and 900) and the descriptions thereof will be omitted. In FIG. 3, the outward facing camera 120 and the image combiner 294 are shown in addition to the parts shown in FIG. 1.

The outward facing camera 120 images from the inside to the outside of the automobile 900. In particular, the outward facing camera 120 images in the same direction as that in which the driver faces the front in a driver's seat.

The image combiner 294 combines a gaze region which is assumed from the direction of the face of the driver and a gaze region which is assumed from the direction of the line of sight of the driver with an image captured by the outward facing camera 120.

Figure 4:
FIG. 4 is a diagram showing an example of an image that an image combiner obtains by combining gaze regions with an image captured by an outward facing camera according to the second embodiment.

FIG. 4 is a diagram showing an example of an image that the image combiner 294 obtains by combining gaze regions with an image captured by the outward facing camera 120. In the example of FIG. 4, the image combiner 294 combines circular gaze regions with the image. A region A11 indicates the gaze region assumed from the direction of the face of the driver. A region A12 indicates the gaze region assumed from the direction of the line of sight of the driver.

Points P11 and P12 indicate the centers (the centers of the circles) of the regions A11 and A12, respectively.

A distance D11 indicates the distance between the points P11 and P12.

For example, the image combiner 294 sets a vertical plane at a predetermined position in front of the automobile 900 from the driver's seat and obtains intersection points between this plane and a straight line indicating the direction of the face of the driver and a straight line indicating the direction of the line of sight of the driver. In the example of FIG. 4, these intersection points are obtained as points P11 and P12.

Then, the image combiner 294 combines circles with predetermined radiuses which are located on the set plane and are centered at the obtained intersection points with the image of the outward facing camera 120. As a result, the image combiner 294 combines the gaze regions (the regions A11 and A12 in the example of FIG. 4) with the image of the outward facing camera 120.

By displaying the gaze region based on the direction of the face and the gaze region based on the direction of the line of sight in this manner, the driving support system 1 can display the deviation (for example, the distance D11) between the direction of the face and the direction of the line of sight. Display of the deviation between the direction of the face and the direction of the line of sight serves as a reference for the driver to understand the content of the alerting.

Next, the operation of the driving support device 200 will be described with reference to FIG. 5.

Figure 5:
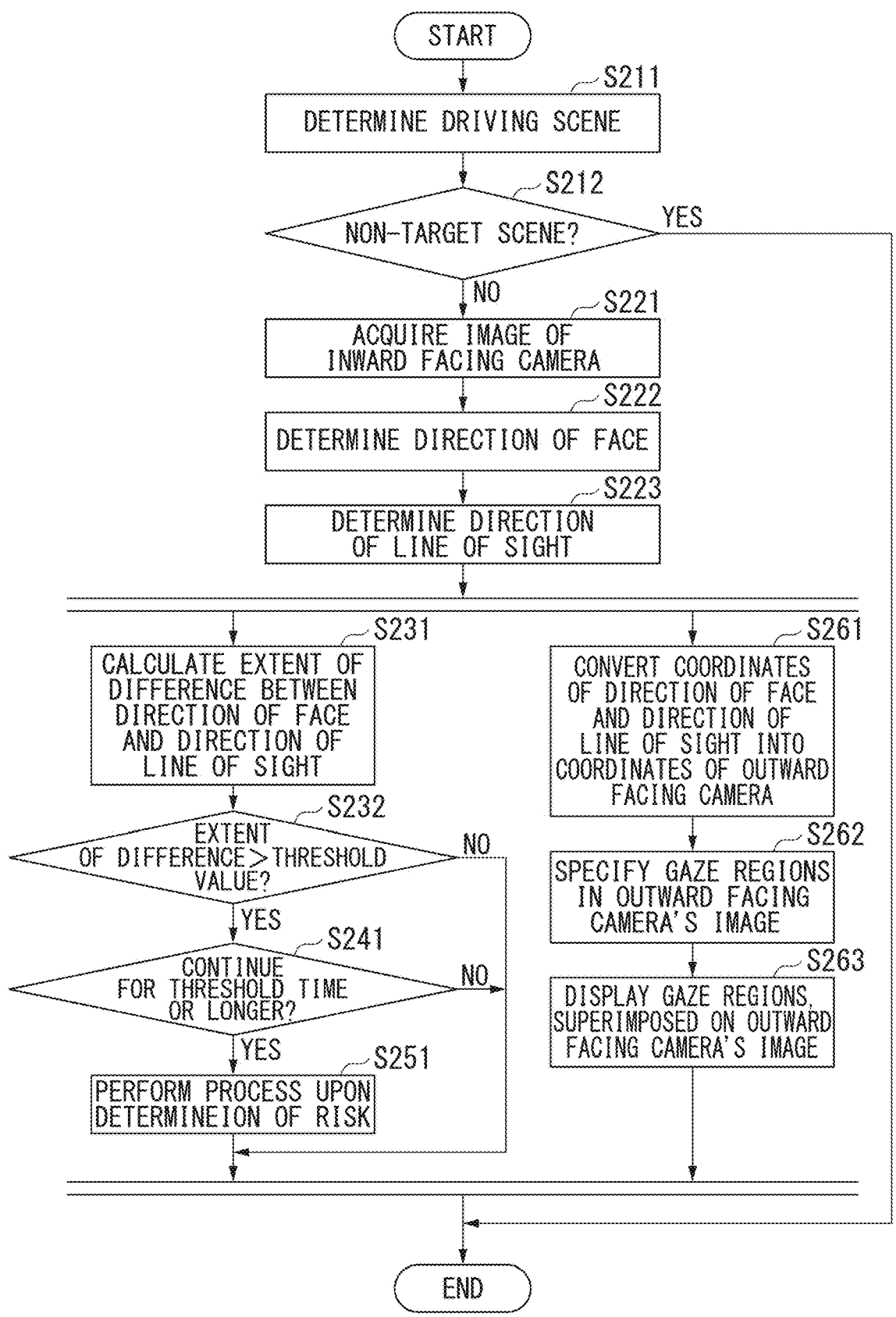
FIG. 5 is a flowchart showing an exemplary procedure in which a driving support device according to the second embodiment determines the direction of the face and the direction of the line of sight of the driver and performs alert processing, and also displays the direction of the face and the direction of the line of sight.

FIG. 5 is a flowchart showing an exemplary procedure in which the driving support device 200 determines the direction of the face and the direction of the line of sight of the driver and performs alert processing, and also displays the direction of the face and the direction of the line of sight.

In the processing of FIG. 5, the driving support device 200 performs a process of displaying the gaze regions in addition to the processing of FIG. 2. Steps S211 to S223 are similar to steps S111 to S123 of FIG. 2. Steps S231 and S232 are similar to steps S124 and S125 of FIG. 2.

Steps S241 to S251 are similar to steps S131 to S141 of FIG. 2.

After step S223, the image combiner 294 performs the processing of steps S261 to S263 in parallel with the processing of steps S231 to S251. The driving support device 200 may perform the processing of steps S231 to S251 and the processing of S261 to S263 in parallel or in a time division manner.

In the processing of steps S261 to S263, the coordinates of the direction of the face determined by the face direction determinator 291 and the direction of the line of sight determined by the line-of-sight direction determinator 292 are converted into coordinates of the outward facing camera 120 (step S261).

Here, the direction of the face and the direction of the line of sight are determined on the basis of the image of the inward facing camera 110, and the inward facing camera 110 and the outward facing camera 120 face approximately opposite to each other. When the coordinates are set on the basis of the imaging directions (optical axes) of the inward facing camera 110 and the outward facing camera 120, the coordinates of the inward facing camera 110 and the coordinates of the outward facing camera 120 are approximately opposite to each other. The image combiner 294 converts the direction of the face and the direction of the line of sight indicated by the coordinates of the inward facing camera 110 into those for display in the coordinates of the outward facing camera 120.

Next, the image combiner 294 specifies the gaze regions in the image of the outward facing camera 120 (step S262). For example, as described above with reference to FIG. 4, the image combiner 294 sets, for example, a vertical plane at a predetermined position in front of the automobile 900 from the driver's seat and obtains intersection points between this plane and a straight line indicating the direction of the face of the driver and a straight line indicating the direction of the line of sight of the driver. Then, the image combiner 294 specifies circles with predetermined radiuses which are located on the set plane and are centered at the obtained intersection points as gaze regions.

Next, the image combiner 294 displays the gaze regions specified in step S262 such that they are superimposed on the image of the outward facing camera 120 (step S263). As a result, the image combined with the gaze regions is obtained as in the example of FIG. 4.

After step S263, the image combiner 294 terminates the processing.

As described above, the outward facing camera 120 images from the inside of the automobile 900 toward the front of the automobile 900 to generate an image. The image combiner 294 combines the gaze region assumed from the direction of the face of the driver and the gaze region assumed from the direction of the line of sight of the driver with the image captured by the outward facing camera 120.

When the driver is alerted by the driving support system 1, the driver can understand the content of the alerting with reference to the image combined with the gaze regions.

As described above, the installation location of the driving support device 200 is not limited to the inside of the automobile 900. The driving support device 200 may be configured as a cloud system and communicate with the automobile 900.

In addition, when an obstacle for the automobile 900 (for example, a pedestrian or another vehicle) appears in the image captured by the outward facing camera 120, it is possible to determine whether or not the image of the obstacle is included in the gaze regions combined by the image combiner 294.

If at least one of the gaze region based on the direction of the face and the gaze region based on the direction of the sight line is directed toward a target (obstacle) and it is not determined in steps S232 to S241 of FIG. 5 that that processing of step S251 is necessary, this indicates that the driver has not greatly moved the face or the line of sight and thus it can be determined that the driver is not performing dangerous driving.

Regarding the determination on the basis of the difference between the direction of the face and the direction of the line of sight, a scene in which the driver moves only the line of sight is considered as a scene of checking mainly with a side mirror or the like. In this case, the movement of the line of sight is within the limits of the movement width of the line of sight and thus it can be considered that the line of sight will return in a short time. Also, when the driver moves both the line of sight and the face, the face and the line of sight are considered to be directed in the same direction and thus the difference between the direction of the face and the direction of the line of sight is not great. Any of these cases can be dealt with through the processing of FIG. 2 and the processing of FIG. 5.

For example, if a distance at which the direction of the face and the direction of the line of sight are greatly separated such as when turning right or left at the intersection point or the like is set as the threshold value (in step S125 in FIG. 2 and step S232 in FIG. 5), it can be considered that it is possible to deal with both drivers who move only the line of sight and drivers who move both the direction of the line of sight and the direction of the face.

The threshold value of the distance between the gaze region based on the direction of the face and the gaze region based on the direction of the line of sight (in step S125 in FIG. 2 and step S232 in FIG. 5) may be varied according to the magnitude of the angle of the direction of the face. For example, the threshold value may be set great when the angle of the direction of the face with respect to the front of the automobile 900 is small and may be set small when the angle is great. This setting is considered to be effective particularly for drivers who safely check with only the line of sight.

<Third Embodiment>

The driving support device may be provided outside the vehicle such as in the cloud as described above. A third embodiment will be described with regard to this point.

Figure 6:
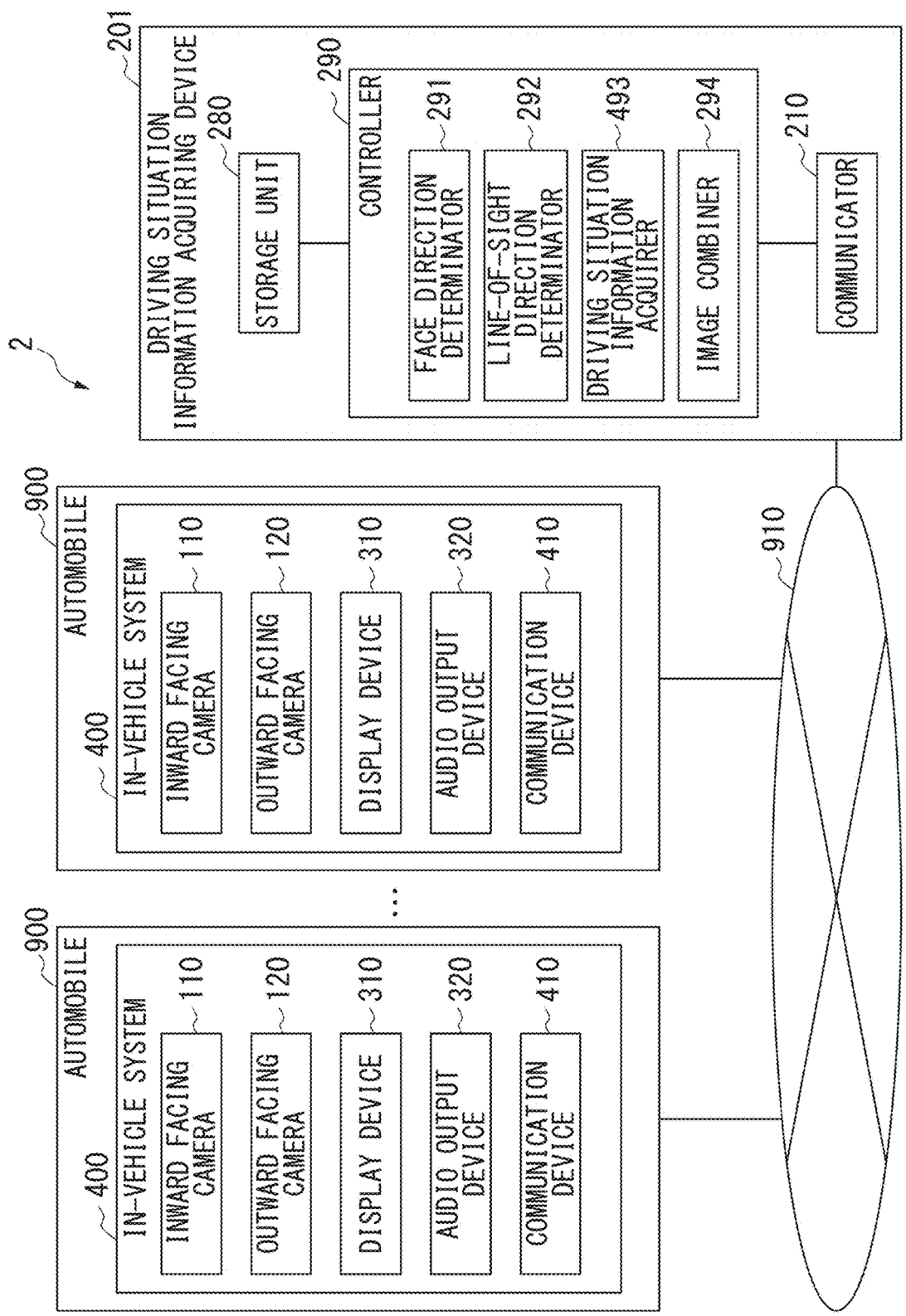
FIG. 6 is a schematic block diagram showing a functional configuration of a driving situation information acquiring system according to a third embodiment of the present invention.

FIG. 6 is a schematic block diagram showing a functional configuration of a driving situation information acquiring system according to the third embodiment of the present invention.

The driving situation information acquiring system 2 shown in FIG. 6 includes a driving situation information acquiring device 201 and an in-vehicle system 400. The in-vehicle system 400 includes an inward facing camera 110, an outward facing camera 120, a display device 310, an audio output device 320, and a communication device 410. The driving situation information acquiring device 201 includes a communicator 210, a storage unit 280, and a controller 290.

The controller 290 includes a face direction determinator 291, a line-of-sight direction determinator 292, a driving situation information acquirer 493, and an image combiner 294. The in-vehicle system 400 and the driving situation information acquiring device 201 communicate with each other via a network 910.

The network 910 may be a communication network that can relay communication between the communicator 210 of the driving support device 200 and the communication device 410 of the in-vehicle system. Due to the mobility of the automobile 900, it is preferable that the network 910 perform wireless communication with the communication device 410. For example, the network 910 may be configured through a combination of the Internet and a mobile phone network (a communication network provided by a communication company for mobile terminals such as smartphones or mobile phones).

The number of automobiles 900 which are subjected to data collection by the driving situation information acquiring system 2 may be one or more.

Of the parts shown in FIG. 6, those corresponding to and having the same functions as those shown in FIG. 3 are denoted by the same reference signs (110, 120, 210, 280, 290, 291, 292, 294, 310, 320, and 900) and the descriptions thereof will be omitted. In FIG. 6, the driving situation information acquiring device 201 is installed outside the vehicle and the communication device 410 is installed in the vehicle to enable communication between each device in the vehicle (in the automobile 900) and the driving support device.

The driving situation information acquirer 493 calculates the extent of the difference between the direction of the face of the driver and the direction of the line of sight. The method of the driving situation information acquirer 493 calculating the extent of the difference between the direction of the face of the driver and the direction of the line of sight is similar to that of the alert processing unit 293 in FIG. 3. The extent of the difference between the direction of the face of the driver and the direction of the line of sight is an index value for determining whether or not the driver's eyesight is appropriate. Thus, the extent of the difference between the direction of the face of the driver and the direction of the line of sight can be considered as a type of driving situation information.

The driving situation information referred to here is information indicating the driving situation.

The driving situation information acquirer 493 may further determine at least one of the necessity and the extent of alerting the driver, similar to the alert processing unit 293 of FIG. 3. However, the driving situation information acquirer 493 itself does not alert the driver since the driving situation information acquirer 493 is located in the driving situation information acquiring device 201 outside the vehicle. Therefore, it is named a driving situation information acquirer instead of an alert processing unit.

When the driving situation information acquirer 493 determines at least one of the necessity and the extent of alerting the driver, the driving situation information acquirer 493 generates information indicating the content of the determination, that is, information indicating at least one of the necessity and the extent of alerting the driver. Then, the driving situation information acquirer 493 transmits the information indicating at least one of the necessity and the extent of alerting the driver to the in-vehicle system 400 via the communicator 210 and the network 910.

In the in-vehicle system 400, one or both of the display device 310 and the audio output device 320 alerts the driver in accordance with the information from the driving situation information acquiring device 201.

By installing the driving situation information acquiring device 201 outside the vehicle such that the driving situation information acquiring device 201 functions as a server for the in-vehicle system 400, the driving situation information acquiring device 201 can collect information from the in-vehicle system 400 in addition to or instead of providing driving support to the driver, similar to the cases of the first embodiment and the second embodiment. For example, the driving situation information acquirer 493 may cause the storage unit 280 to store information indicating the driving situation in addition to or instead of transmitting the information for alerting to the in-vehicle system 400 as described above.

The information indicating the driving situation referred to here may be one or both of information indicating the extent of the difference between the direction of the face of the driver and the direction of the line of sight and information indicating the necessity and the extent of alerting the driver. Alternatively, the information indicating the driving situation referred to here may further include any of information on the surroundings of the automobile 900 such as the position information of obstacles around the automobile 900, information indicating the state of the automobile 900 such as the speed of the automobile 900, or information indicating the state of the driver such as the frequency of blinking of the driver, or a combination thereof.

In the third embodiment, the names "driving situation information acquiring system" and "driving situation information acquiring device" are used since they do not necessarily alert the driver as described above.

When not alerting the driver, the display device 310 and the audio output device 320 of the in-vehicle system 400 are not indispensable.

On the other hand, when the driving situation information acquiring system 2 alerts the driver, the driving situation information acquiring system can be referred to as a driving support system. The driving situation information acquiring device can also be referred to as a driving support device.

Although FIG. 6 shows an example in which the in-vehicle system 400 is mounted in the automobile 900, the movable body in which the in-vehicle system 400 is mounted is not limited to the automobile and may be any of various types of vehicles that the driver needs to drive while looking a proper direction, similar to the case of FIG. 1.

In addition, although FIG. 6 shows an example in which the driving support device having the configuration of FIG. 3 is disposed outside the vehicle, the driving support device having the configuration of FIG. 1 may be disposed outside the vehicle.

As described above, in the configuration shown in FIG. 6, the driving situation information acquiring device 201 can aggregate a record of the driving situation of each automobile 900 in addition to being able to alert the driver, similar to the case of FIG. 3.

For example, the in-vehicle system 400 may alert the driver and transmit a record of the alert and a driving situation at that time to the driving situation information acquiring device 201.

This allows the driving situation information acquiring device 201 to check the driving situation and also to accumulate information of the driving situation.

In the configuration in which the driving support device 200 is mounted in the vehicle as shown in FIG. 3, it is possible to perform alerting in real time but it is not possible to determine whether or not the driving for alerting is truly dangerous.

On the other hand, in the configuration in which the driving situation information acquiring system 2 is configured in the form of a server-client type as shown in FIG. 6, the user of the driving situation information acquiring device 201 (for example, a business operator providing a driving support service) can remotely check the driving situation and can determine whether or not the driving is dangerous.

Further, the user of the driving situation information acquiring device 201 can give driving safety guidance to the driver using a scene which is determined as that of dangerous driving. Here, it is possible to give safe driving guidance, such as providing information, not only to the driver whose driving has been determined to be dangerous but also to other drivers.

Next, minimum configurations of the present invention will be described with reference to FIGS. 7 and 8.

Figure 7:
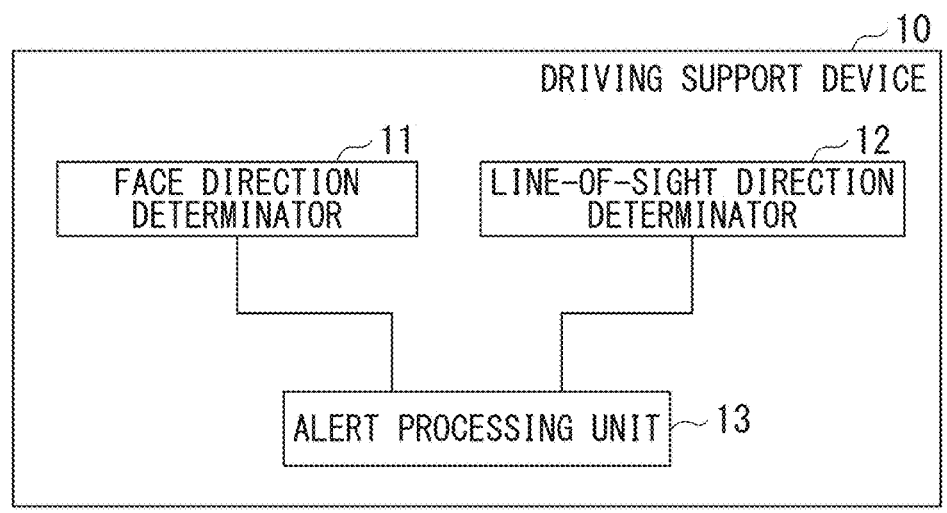
FIG. 7 is a diagram showing an exemplary minimum configuration of a driving support device according to the present invention.

FIG. 7 is a diagram showing an exemplary minimum configuration of the driving support device according to the present invention. The driving support device 10 shown in FIG. 7 includes a face direction determinator 11, a line-of-sight direction determinator 12, and an alert processing unit 13.

In this configuration, the face direction determinator 11 determines the direction of the face of the driver. The line-of-sight direction determinator 12 determines the direction of the line of sight of the driver. The alert processing unit 13 determines at least one of the necessity and the extent of alerting the driver on the basis of the extent of the difference between the direction of the face and the direction of the line of sight.

The direction of the face of the driver and the direction of the line of sight are generally considered to coincide roughly regardless of the direction in which the driver should look except in specific driving scenes such as when the driver faces back to back the automobile up. When the direction of the face of the driver and the direction of the line of sight do not coincide roughly, the driver is considered to be, for example, looking away such as, for example, when the driver is distracted by the scenery of the roadside.

Therefore, the alert processing unit 13 alerts the driver when the direction of the face of the driver and the direction of the line of sight differ by a predetermined condition or more. Thus, according to the driving support device 10, it is possible to evaluate the direction in which the driver is looking even when the direction in which the driver should look has changed depending on the driving situation.

Figure 8:
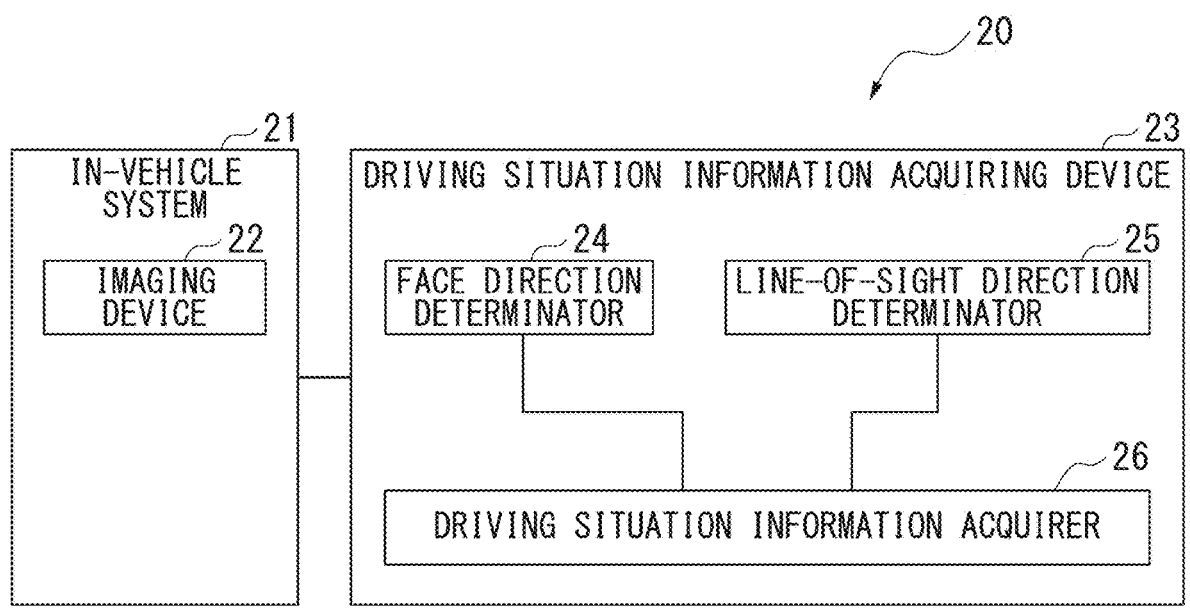
FIG. 8 is a diagram showing an exemplary minimum configuration of a driving situation information acquiring system according to the present invention.

FIG. 8 is a diagram showing an exemplary minimum configuration of the driving situation information acquiring system according to the present invention. The driving situation information acquiring system 20 shown in FIG. 8 includes an in-vehicle system 21 and a driving situation information acquiring device 23. The in-vehicle system 21 includes an imaging device 22. The driving situation information acquiring device 23 includes a face direction determinator 24, a line-of-sight direction determinator 25, and a driving situation information acquirer 26.

In this configuration, the in-vehicle system 21 is mounted in a movable body. The imaging device 22 captures an image of the face of the driver of the movable body. The driving situation information acquiring device 23 performs communication with the in-vehicle system 21. The face direction determinator 24 determines the direction of the face of the driver on the basis of the image of the face of the driver. The line-of-sight direction determinator 25 determines the direction of the line of sight of the driver on the basis of the image of the face of the driver.

The driving situation information acquirer 26 generates driving situation information indicating at least one of the necessity and the extent of alerting the driver on the basis of the extent of the difference between the direction of the face and the direction of the line of sight.

The direction of the face of the driver and the direction of the line of sight are generally considered to coincide roughly regardless of the direction in which the driver should look except in specific driving scenes such as when the driver faces back to back the automobile up. When the direction of the face of the driver and the direction of the line of sight do not coincide roughly, the driver is considered to be, for example, looking away such as, for example, when the driver is distracted by the scenery of the roadside.

Therefore, the driving situation information acquirer 26 generates driving situation information indicating that it is necessary to alert the driver or driving situation information indicating that the extent of alerting the driver is strong when the direction of the face of the driver and the direction of the line of sight differ by a predetermined condition or more. Thus, according to the driving situation information acquiring system 20, it is possible to evaluate the direction in which the driver is looking even when the direction in which the driver should look has changed depending on the driving situation.

Note that a program for realizing all or part of the processing performed by the controller 290 may be recorded in a computer readable recording medium and the processing of each part may be performed by causing the computer system to read and execute the program recorded in the recording medium. Also note that "computer system" referred to here includes an OS and hardware such as peripheral devices.

Further, "computer readable recording medium" refers to a flexible disk, a magneto-optical disc, a ROM, a portable medium such as a CD-ROM, and a storage device such as a hard disk built in the computer system. Furthermore, the program may be one for realizing some of the functions described above and may also be one that can realize the functions described above in combination with a program already recorded in the computer system.

Although the embodiments of the present invention have been described above in detail with reference to the drawings, the specific configurations thereof are not limited to those of the embodiments and include designs or the like without departing from the spirit of the present invention.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A driving support device comprising:
a face direction determinator configured to determine a direction of a face of a driver of a movable body;

a line-of-sight direction determinator configured to determine a direction of a line of sight of the driver; and
an alert processing unit configured to:
determine at least one of a necessity and an extent of alerting the driver based on an extent of a difference between the direction of the face and the direction of the line of sight and duration during which the extent of the difference between the direction of the face and the direction of the line of sight continues,
determine whether or not the duration during which the extent of the difference continues is greater than or equal to a predetermined time, and
alert the driver when it is determined that the duration during which the extent of the difference continues is greater than or equal to the predetermined time.

2. The driving support device according to claim 1, wherein the alert processing unit is configured to determine to perform the alerting of the driver when the extent of the difference between the direction of the face and the direction of the line of sight remains equal to or greater than a predetermined threshold value for the predetermined time or longer.

3. The driving support device according to claim 2, wherein the alert processing unit is configured to determine at least one of the necessity and the extent of alerting the driver, assuming that a case in which it is not possible to determine at least one of the direction of the face and the direction of the line of sight is a same as when the extent of the difference remains equal to or greater than the predetermined threshold value.

4. The driving support device according to claim 1, further comprising a controller configured to suppress the alerting of the driver upon determining that a driving scene of the movable body corresponds to a predetermined scene based on at least one of a moving speed and a moving direction of the movable body.

5. The driving support device according to claim 1, further comprising:
an output unit configured to output information alerting the driver.

6. The driving support device according to claim 5, wherein the output unit is configured to output information indicating a deviation between the direction of the face and the direction of the line of sight.

7. The driving support device according to claim 5, wherein the output unit is configured to combine a first image of a gaze region based on the direction of the face and a second image of a gaze region based on the direction of the line of sight with a third image captured by an outward facing camera, and output combined image.

8. A driving situation information acquiring system comprising:
an in-vehicle system mounted in a movable body; and
a driving situation information acquiring device configured to perform communication with the in-vehicle system,
wherein the in-vehicle system includes an imaging device configured to capture an image of a face of a driver of the movable body, and
the driving situation information acquiring device includes:
a face direction determinator configured to determine a direction of the face of the driver based on the image of the face of the driver;
a line-of-sight direction determinator configured to determine a direction of a line of sight of the driver based on the image of the face of the driver; and
a driving situation information acquirer configured to:
calculate an extent of a difference between the direction of the face and the direction of the line of sight and duration during which the extent of the difference between the direction of the face and the direction of the line of sight continues;
determine whether or not the duration during which the extent of the difference continues is greater than or equal to a predetermined time; and
alert the driver when it is determined that the duration during which the extent of the difference continues is greater than or equal to the predetermined time.

9. A driving support method comprising:
determining a direction of a face of a driver of a movable body;
determining a direction of a line of sight of the driver;
determining at least one of a necessity and an extent of alerting the driver based on an extent of a difference between the direction of the face and the direction of the line of sight and duration during which the extent of the difference between the direction of the face and the direction of the line of sight continues;
determining whether or not the duration during which the extent of the difference continues is greater than or equal to a predetermined time; and
alerting the driver when it is determined that the duration during which the extent of the difference continues is greater than or equal to the predetermined time.

10. A non-transitory computer-readable recording medium storing a program that causes a computer to execute processing including:
determining a direction of a face of a driver of a movable body;
determining a direction of a line of sight of the driver;
determining at least one of a necessity and an extent of alerting the driver based on an extent of a difference between the direction of the face and the direction of the line of sight and duration during which the extent of the difference between the direction of the face and the direction of the line of sight continues;
determining whether or not the duration during which the extent of the difference continues is greater than or equal to a predetermined time; and
alerting the driver when it is determined that the duration during which the extent of the difference continues is greater than or equal to the predetermined time.

* * * * *